US009621922B2

(12) United States Patent
Hinds (10) Patent No.: US 9,621,922 B2
(45) Date of Patent: Apr. 11, 2017

(54) DATA TRANSFORMATION (71) Applicant: Cable Television Laboratories, Inc., Louisville, CO (US)

(72) Inventor: Arianne T. Hinds, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 251 days.

(21) Appl. No.: 14/604,680

(22) Filed: Jan. 24, 2015

(65) Prior Publication Data

US 2015/0215574 A1    Jul. 30, 2015

Related U.S. Application Data

(60) Provisional application No. 61/931,629, filed on Jan. 26, 2014.

(51) Int. Cl.
*H04N 7/01* (2006.01)
*H04N 19/60* (2014.01)
*G06F 17/14* (2006.01)

(52) U.S. Cl.
CPC ........... *H04N 19/60* (2014.11); *G06F 17/147* (2013.01)

(58) Field of Classification Search
CPC ....................................................... H04N 7/01
USPC .......................................................... 375/42
See application file for complete search history.

(56) References Cited

U.S. PATENT DOCUMENTS

| | | | |
|---|---|---|---|
| 6,175,592 | B1 | 1/2001 | Kim |
| 2003/0081851 | A1 | 5/2003 | Sadeh |
| 2007/0237414 | A1 | 10/2007 | Cho |
| 2011/0013831 | A1 | 1/2011 | Yokose |
| 2013/0003824 | A1 | 1/2013 | Guo |

OTHER PUBLICATIONS

Written Opinion of corresponding PCT application PCT/US2015/12789, issued Apr. 21, 2015 with USPTO as ISA.

*Primary Examiner* — Christopher S Kelley
*Assistant Examiner* — Jonathan Messmore
(74) *Attorney, Agent, or Firm* — Great Lakes Intellectual Property, PLLC.

(57) ABSTRACT

Data transforms suitable for transforming data, such as not necessarily limited to those suitable for transforming data from a spatial domain to a frequency domain, is contemplated. The data transforms may correspond with a discrete cosine transform (DCT), an inverse discrete cosine transform (IDCT), a discrete Fourier transform (DFT), an inverse DFT (IDFT), a modulated lapped transform (MLT), an inverse MLT, a modulated complex lapped transform (MCLT), an inverse MCLT, etc. where the corresponding basis functions are optimized depending on whether data being transformed is characterized as square and non-square.

16 Claims, 3 Drawing Sheets

DATA TRANSFORMATION

CROSS-REFERENCE TO RELATED APPLICATIONS

This application claims the benefit of U.S. provisional Application No. 61/931,629 filed Jan. 26, 2014, the disclosure of which is incorporated in its entirety by reference herein.

TECHNICAL FIELD

The present invention relates to transforms suitable for transforming data, such as not necessarily limited to those suitable for transforming data from a spatial domain to a frequency domain.

BACKGROUND

Transforms may be employed to convert data from one domain to another domain. A discrete cosine transform (DCT) may be used to transform data from a spatial domain to a frequency domain and an inverse discrete cosine transform (IDCT) may be used to transform data from the frequency domain to the spatial domain. DCT may be used for image/video compression to spatially decorrelate blocks of picture elements (pixels) in images or video frames. The resulting transform coefficients may be much less dependent on each other, which makes these coefficients particularly suitable for quantization and encoding. DCT also exhibits energy compaction property, i.e., the ability to map most of the energy of a block of pixels to only few (typically low order) transform coefficients, which can simplify the design of encoding algorithms and/or ameliorate the amount of data being transmitted The DCT is widely regarded as the best suboptimal orthogonal transform for the purposes of energy compaction, especially with regard to natural images. That is, its ability to concentrate the energy of natural images into a relatively small number of transform coefficients closely approximates the optimal Karhunen-Loeve transform (KLT). The DCT is also a unitary transform which means that it is comprised of orthonormal basis functions (the norm of each of its basis vectors is one) and its inverse is its transpose. Type-2 DCT is the most widely deployed in popular still image and video standards such as JPEG7, MPEG18, MPEG 29, H.26310, and MPEG 411 and also serves as the definition for the fixed-point implementation that approximates it in MPEG C (ISO/IEC 23002-2), the disclosures of which are hereby incorporated by reference in their entireties herein.

A two-dimensional Type-2 DCT of an M-by-N matrix f is defined below in equation (1) as:

$$F(u, v) = c(u)c(v)\sum_{x=0}^{M-1}\sum_{y=0}^{N-1} f(x, y)\cos\frac{(2x+1)u\pi}{2M}\cos\frac{(2y+1)v\pi}{2N},$$

$$0 \leq x \leq M-1, 0 \leq y \leq N-1$$

wherein:

$$c(v) = \begin{cases} \frac{1}{\sqrt{N}}, & v = 0 \\ \frac{2}{\sqrt{2/N}}, & 1 \leq v \leq N-1 \end{cases};$$

$$c(u) = \begin{cases} \frac{1}{\sqrt{M}}, & u = 0 \\ \frac{2}{\sqrt{2/M}}, & 1 \leq u \leq M-1 \end{cases};$$

and f(x, y) represents a two-dimensional input matrix of sample values and F(u, v) represents a two-dimensional coefficient matrix as an M-by-N matrix of transform coefficients.

The matrix f(x, y) can be perfectly reconstructed from F(u, v) by application of the corresponding IDCT as defined below in equation (2):

$$f(x, y) = \sum_{u=0}^{M-1}\sum_{v=0}^{N-1} c(u)c(v)F(u, v)\cos\frac{(2x+1)u\pi}{2M}\cos\frac{(2y+1)v\pi}{2N},$$

$$0 \leq x \leq M-1, 0 \leq y \leq N-1$$

The DCT is a separable transform as defined below in equation (3):

$$F(u, v) = c(u)\sum_{x=0}^{M-1} f(x, y)\cos\frac{(2x+1)u\pi}{2M} c(v)\sum_{y=0}^{N-1} f(x, y)\cos\frac{(2y+1)v\pi}{2N}$$

The corresponding basis functions may be as follows:
sf=0.353553
p=0,m=0,coeff=1.0000000000000000
p=0,m=1,coeff=1.0000000000000000
p=0,m=2,coeff=1.0000000000000000
p=0,m=3,coeff=1.0000000000000000
p=0,m=4,coeff=1.0000000000000000
p=0,m=5,coeff=1.0000000000000000
p=0,m=6,coeff=1.0000000000000000
p=0,m=7,coeff=1.0000000000000000
sf=0.500000
p=1,m=0,coeff=0.9807852804032304
p=1,m=1,coeff=0.8314696123025452
p=1,m=2,coeff=0.5555702330196023
p=1,m=3,coeff=0.1950903220161283
p=1,m=4,coeff=-0.1950903220161282
p=1,m=5,coeff=-0.5555702330196020
p=1,m=6,coeff=-0.8314696123025453
p=1,m=7,coeff=-0.9807852804032304
sf=0.500000
p=2,m=0,coeff=0.9238795325112867
p=2,m=1,coeff=0.3826834323650898
p=2,m=2,coeff=-0.3826834323650897
p=2,m=3,coeff=-0.9238795325112867
p=2,m=4,coeff=-0.9238795325112867
p=2,m=5,coeff=-0.3826834323650903
p=2,m=6,coeff=0.3826834323650900
p=2,m=7,coeff=0.9238795325112865
sf=0.500000
p=3,m=0,coeff=0.8314696123025452
p=3,m=1,coeff=-0.1950903220161282
p=3,m=2,coeff=-0.9807852804032304
p=3,m=3,coeff=-0.5555702330196022
p=3,m=4,coeff=0.5555702330196018
p=3,m=5,coeff=0.9807852804032304 p=3,m=6,coeff=0.1950903220161288
p=3,m=7,coeff=−0.8314696123025451
sf=0.500000
p=4,m=0,coeff=0.7071067811865476
p=4,m=1,coeff=−0.7071067811865475
p=4,m=2,coeff=−0.7071067811865477
p=4,m=3,coeff=0.7071067811865475
p=4,m=4,coeff=0.7071067811865477
p=4,m=5,coeff=−0.7071067811865467
p=4,m=6,coeff=−0.7071067811865472
p=4,m=7,coeff=0.7071067811865466
sf=0.500000
p=5,m=0,coeff=0.5555702330196023
p=5,m=1,coeff=−0.9807852804032304
p=5,m=2,coeff=0.1950903220161283
p=5,m=3,coeff=0.8314696123025456
p=5,m=4,coeff=−0.8314696123025451
p=5,m=5,coeff=−0.1950903220161280
p=5,m=6,coeff=0.9807852804032307
p=5,m=7,coeff=−0.5555702330196015
sf=0.500000
p=6,m=0,coeff=0.3826834323650898
p=6,m=1,coeff=−0.9238795325112867
p=6,m=2,coeff=0.9238795325112865
p=6,m=3,coeff=−0.3826834323650898
p=6,m=4,coeff=−0.3826834323650906
p=6,m=5,coeff=0.9238795325112867
p=6,m=6,coeff=−0.9238795325112863
p=6,m=7,coeff=0.3826834323650896
sf=0.500000
p=7,m=0,coeff=0.1950903220161283
p=7,m=1,coeff=−0.5555702330196022
p=7,m=2,coeff=0.8314696123025456
p=7,m=3,coeff=−0.9807852804032307
p=7, m=4, coeff=0.9807852804032304
p=7,m=5,coeff=−0.8314696123025450
p=7,m=6,coeff=0.5555702330196015
p=7,m=7,coeff=−0.1950903220161286

(sf is the scale factor used to scale the resulting coefficients.)

As noted, the DCT is an analysis tool suitable for separating an image or video signal into its frequency components so that the magnitudes of those frequency components can be subsequently tuned to achieve a desired level of compression for the original image or video signal. The DCT is typically performed using a set of cosine basis functions that are selected to be orthonormal, i.e., the corresponding basis functions are then used to analyze both the vertical and horizontal frequencies of the input signal when images or video using the same basis functions.

The DCT in common image and video systems, such as but not necessarily limited to that described ISO/IEC 23008-2 High Efficiency Video Coding (HEVC), the disclosure of which is hereby incorporated by reference in its entirety herein, is designed due to the common treatment of vertical and horizontal frequencies to operate on square blocks of sample values, e.g., blocks that are either 4×4, 8×8, 16×16, or 32×32 samples in size. Application of such square transform functions can be problematic if the underlying data, signal, image, video, etc. is not square or otherwise fails to share the characteristics that cause square samples to be beneficially transformed using the DCT noted above.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
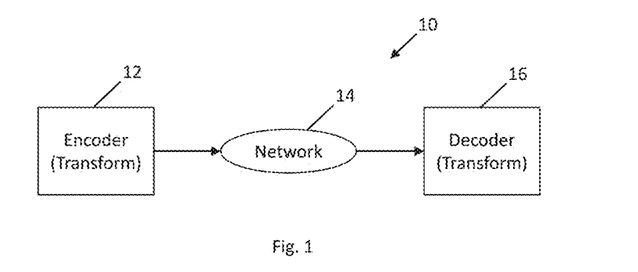
FIG. 1 illustrates a system for transforming data in accordance with one non-limiting aspect of the present invention.

FIG. 1 illustrates a system 10 for transforming data in accordance with one non-limiting aspect of the present invention. The system 10 describes an exemplary application where an encoder 12 encodes data for transport over a network 14 to a decoder 16 for subsequent decode and output. The system 10 encompasses any environment where data may be transmitted over the network 14, such as the Internet, a home network, etc. or through any other wireless and/or wireline network or medium. The encoder 12 and the decoder 16 are shown to be separated from each other but the corresponding devices and operations associated therewith may be co-located or integrated into a single device. The separated encoder and decoder 12, 16 are presented in order to demonstrate one non-limiting aspect of the present invention where the encoder 12, such as one associated with a service provider, encodes data for transmission to decoders 16 at subscriber premises, such as to provide cable television services, broadcast television services, high-speed Internet/data services, cellular or voice over Internet protocol (VoIP) services and any other type of data-dependent service amenable to the data transformations contemplated herein.

The encoder and decoder 12, 16 or other device facilitating or implementing the data transforms contemplated herein may include a computer-readable medium having non-transitory instructions operable with a processor to facilitate data transformations according to a transform. The data transform capabilities enabled herein may be used for various types of transforms, such as but not necessary limited to discrete cosine transform (DCT), inverse discrete cosine transform (IDCT), discrete Fourier transform (DFT), inverse DFT (IDFT), modulated lapped transform (MLT), inverse MLT, modulated complex lapped transform (MCLT), inverse MCLT, etc. The contemplated data transforms may be suitable for all applications such as image, video, and audio processing, communication, computing, data networking, data storage, graphics, etc. The present invention may be used for any application relying on a transform, and for exemplary non-limiting purposes, is predominately described with respect to facilitating transform of images and/or video between a spatial domain and a frequency domain according to DCT and IDCT, such as to facilitate transporting video frames according to ISO/IEC 13818-2 the disclosure of which is hereby incorporated by reference in its entirety.

Figure 2:
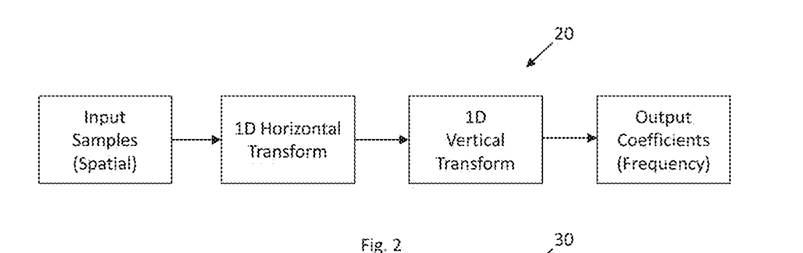
FIG. 2 illustrates a diagram for transforming data from a spatial domain to a frequency domain in accordance with one non-limiting aspect of the present invention.
Figure 3:
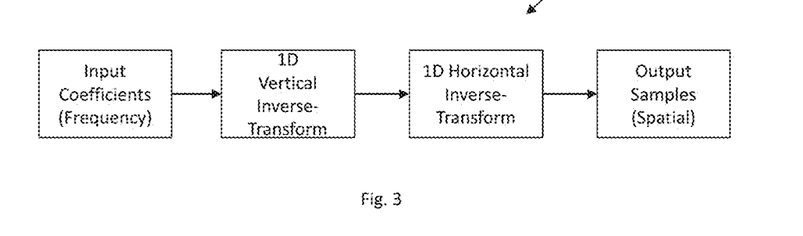
FIG. 3 illustrates a diagram for transforming data from a frequency domain to a spatial domain in accordance with one non-limiting aspect of the present invention.

FIG. 2 illustrates a diagram 20 for transforming data from a spatial domain to a frequency domain in accordance with one non-limiting aspect of the present invention. The contemplated data transform may be performed by the encoder 12 determining an input matrix of sample values (samples), performing a horizontal transform and then a vertical transform (or vice versa) of the input samples according to a DCT in order to generate a output matrix of transform coefficients. FIG. 3 illustrates a diagram 30 for transforming data from a frequency domain to a spatial domain in accordance with one non-limiting aspect of the present invention. The contemplated data transform may be performed by the decoder 16 determining an input matrix of transform coefficients, performing a vertical transform and then a horizontal transform (or vice versa) of the input coefficients according to an IDCT in order to generate a output matrix of samples. The depicted data transform processes may be performed in a manner similar to that described in "Information technology—MPEG video technologies—Part 2: Fixed-point 8×8 inverse discrete cosine transform and discrete cosine transform", ISO/IEC 23002-2, first edition, published 2008 Jun. 1, the disclosure of which is hereby incorporated by reference in its entirety herein. One non-limiting aspect of the present invention contemplates selecting the DCT and corresponding IDCT depending on the characteristics of the data/signal being transformed, such as utilizing a non-square DCT/IDCT if the underlying data is non-square and square DCT/IDCT if the underlying data is square.

Figure 4:
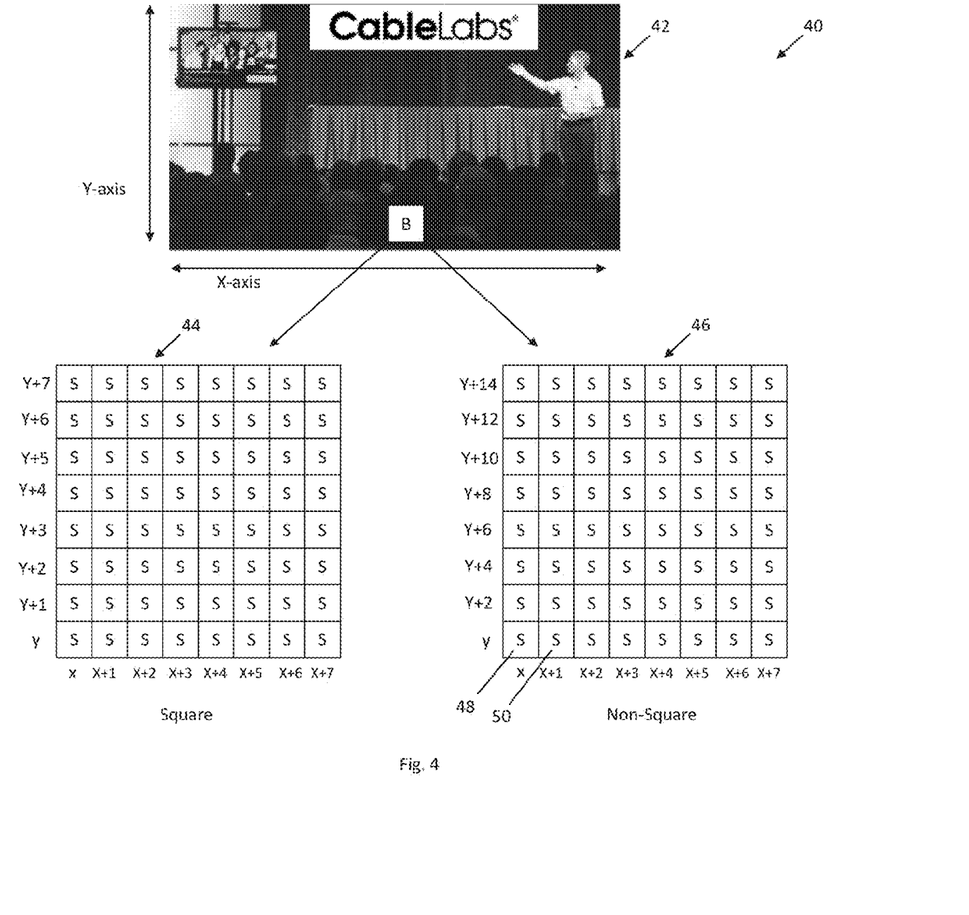
FIG. 4 illustrates a diagram for determining whether data being transformed is square or non-square in accordance with one non-limiting aspect of the present invention.

FIG. 4 illustrates a diagram 40 for determining whether the data being transformed is square or non-square in accordance with one non-limiting aspect of the present invention. While the present invention contemplates transforming data/signals of any type, the diagram 40 illustrates an exemplary scenario where a block or macroblock (B) is selected for transform, such as that described in U.S. patent Ser. No. 11/956,471, entitled Method of Coding and Transmission of Progressive Video Using Differential Signal Overlay, the disclosure of which is hereby incorporated by reference in its entirety herein. The block (B) is shown to correspond with an eight pixel by eight pixel portion of a video frame 42 desired for transform and transport, herein referred to as an 8×8 block. While the present invention could be similarly utilized for 4×4, 16×16, 32×32 and other size blocks, as employed with MPEG-2, AVC|H.264, and HEVC|H.265, the 8×8 block is believed to be widely employed and as such predominately described for exemplary non-limiting purposes. The diagram 40 illustrates a square matrix 44 and a non-square matrix 46 for the block (B) derived from scaling or otherwise processing the pixels, such as by representing each pixel with three attributes (each eight bits long)—one luminance attribute (Y) and two chrominance attributes (CbCr).

In terms of MPEG-2, the image of a corresponding block (B) may represent pixels in the spatial domain as a two-dimensional input matrix of samples (S) within the YCbCr color space where Y is the luminance space, Cb is the blue color difference signal and Cr is the red color difference signal (a plurality of blocks (B) may be transformed in order to transport an entirety of the corresponding frame 42). The resulting square and non-square matrixes 44, 46 generically reference the samples (S) in the spatial domain as the associated samples (S) may be generated from any number of additional processes, optionally including those providing rounding, filtering, center ranging and other manipulations intended to facilitate converting the raw pixels to samples (S) suitable for transform. The square and on-square matrixes 44, 46 are presented in order to illustrate one manner in which the blocks (B) being transformed may be used to represent the underlying data differently. The square matrix 44 may be used to facilitate transform and transport of a progressive image/video, i.e., one in which each pixel adjoins another pixel having color/image, and the non-square matrix 46 may be used to facilitate transform and transport of an interlace image/video, i.e., one in which each pixel in the horizontal direction (columns) adjoins another pixel and each pixel in the vertical direction (rows) is adjoin with a blank (non-colored/empty pixel).

The samples (S) comprising the square and non-square matrixes 44, 46 are shown relative to an X-Y coordinate system defining positioning of each corresponding pixel relative to a X-axis (horizontal) position (x) and Y-axis (vertical) position (y) associated with the video frame 42. The correlation of each sample (S) to the video frame 42 may be represented with two-dimensional coordinates (x, y), e.g., a first pixel 48 may corresponding with (x,y), a second 50 pixel may correspond with (x+1, y+1), etc. The square matrix 44 includes the samples (S) in the vertical direction where the underlining data corresponds with adjoining pixels of the video frame, i.e., at Y, Y+1, . . . Y+7, whereas the non-square matrix 46 includes the samples (S) in the vertical direction where the underlying data corresponds with non-adjoining pixels or every other row of pixels for the video frame, i.e., at Y, Y+2, . . . Y+14. The square and non-square matrixes 44, 46 commonly include the samples (S) in the horizontal direction where the underlining data corresponds with adjoining pixels of the video frame, i.e., at X, X+1, . . . X+7. The encoder 12 may be configured to generate the square and non-square matrixes 44, 46 from the pixels in the video frame 42 by encoding eight adjoining rows of pixels in the vertical direction for the square matrix 42 and encoding every other one of 16 adjoining rows of pixels in a vertical direction for the non-square matrix 44.

Figure 5:
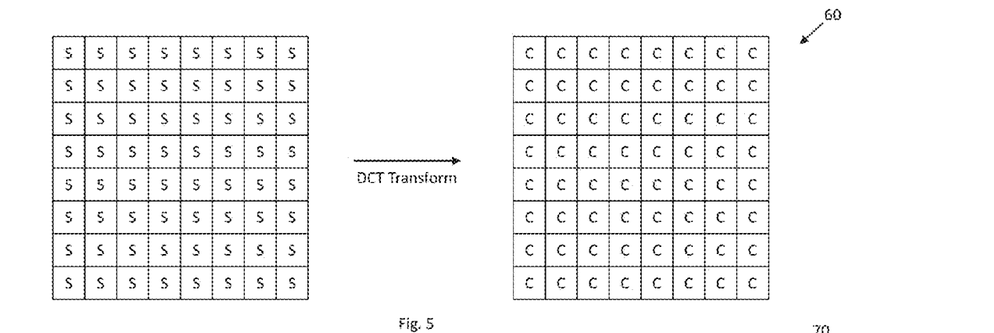
FIG. 5 illustrates a diagram for transforming samples (S) in the spatial domain to transform coefficients (C) in accordance with one non-limiting aspect.
Figure 6:
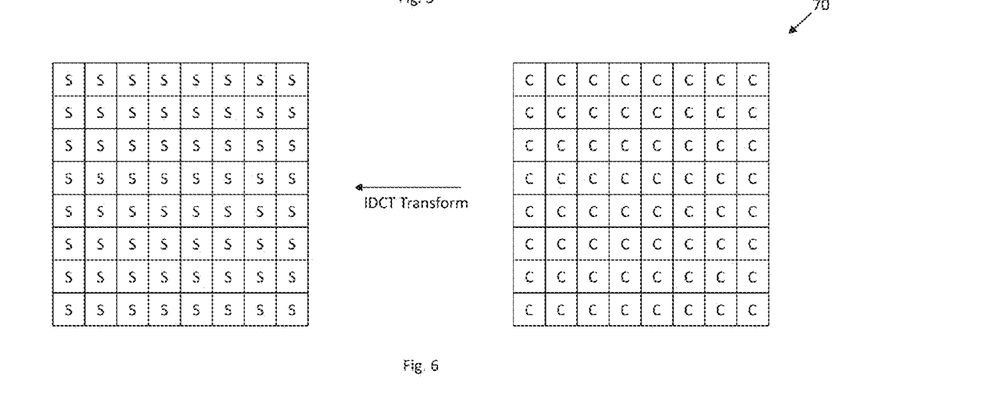
FIG. 6 illustrates a diagram for transforming transform coefficients (C) in the frequency domain to samples (S) in the spatial domain in accordance with one non-limiting aspect.

FIG. 5 illustrates a diagram 60 for transforming the samples (S) in the spatial domain to transform coefficients (C) in the frequency domain using a DCT transform in accordance with one non-limiting aspect. FIG. 6 illustrates a diagram 70 for transforming the transform coefficients (C) in the frequency domain to samples (S) in the spatial domain using an IDCT transform in accordance with one non-limiting aspect. The transforms illustrated in FIGS. 2, 3, 5 and 6 may be performed using DCTs and IDCTs selected according to a square or a non-square encoding of the original samples (S). One non-limiting aspect of the present invention contemplates using a first DCT and a corresponding first IDCT in the event the characteristic is square and a second DCT and a corresponding second IDCT in the even the characteristic is non-square. The first DCT may correspond with the DCT and IDCT described above in background section, assuming an 8×8 block (B), and the second DCT and IDCT may correspond with one having different basis functions intended to compensate for the samples (S) representing every other line of vertical pixels in the encoded video frame, image, etc. It is believed the second DCT and IDCT may be better suited to subsequent decode and output of an interlaced or non-square media. The second DCT and IDCT, interchangeable referred to as a second transform, are described herein for exemplary non-limiting purposes with respect to an 8×8 block (B) but may adaptable to other block sizes without deviating from the scope and contemplation of the present invention.

The second transform may be a two-dimensional Type-2 DCT of an M-by-N matrix f as defined below in equation (3) as:

$$F(u, v) = c(u)c(v)\sum_{x=0}^{M-1}\sum_{y=0}^{N-1} f(x, y)\cos\frac{(2x+1)u\pi}{2M}\cos\frac{(8y+2)v\pi}{2*2N},$$

$$0 \le x \le M-1, 0 \le y \le N-1$$

wherein:

$$c(v) = \begin{cases} \frac{\sqrt{2}}{\sqrt{N}}, & v = 0 \\ \frac{2\sqrt{2}}{\sqrt{2/N}}, & 1 \le v \le N-1 \end{cases};$$

$$c(u) = \begin{cases} \frac{1}{\sqrt{M}}, & u = 0 \\ \frac{2}{\sqrt{2/M}}, & 1 \le u \le M-1 \end{cases};$$

and f(x, y) represents a two-dimensional input matrix of sample values and F(u, v) represents a two-dimensional coefficient matrix as an M-by-N matrix of transform coefficients.

The matrix f(x, y) can be perfectly reconstructed from F(u, v) by application of the corresponding IDCT as defined below in equation (2):

$$f(x, y) = \sum_{u=0}^{M-1}\sum_{v=0}^{N-1} c(u)c(v)F(u, v)\cos\frac{(2x+1)u\pi}{2M}\cos\frac{(8y+2)v\pi}{2*2N},$$

$$0 \le x \le M-1, 0 \le y \le N-1$$

The DCT is a separable transform as defined below in equation (4):

$$F(u, v) = c(u)\sum_{x=0}^{M-1} f(x, y)\cos\frac{(2x+1)u\pi}{2M} c(v)\sum_{y=0}^{N-1} f(x, y)\cos\frac{(2y+1)v\pi}{2*2N}$$

Which upon inspection, illustrates that the 2-D transform can be separated into two single 1-D transforms that are performed first along one axis (such as the columns/vertical direction in a block of video samples), and then along the other axis (the rows/horizontal direction of the output block resulting from the column transform).

The second transform may generate basis functions derived by factoring into the definition of a Type 2 DCT new values corresponding to the length of a period of the signal and the distance between two adjacent sample values. The length of the period is increased from 8 to 16 for the vertical direction for an 8×8 block (B), and the distance between the two adjacent sample values is increased from one to two for the vertical direction. These modifications are not relevant to the horizontal direction which is not decimated, thus establishing a ratio of horizontal to vertical samples for interlace scanned video as 2:1. The ratio could vary for other signals and generically the DCT could be so modified to accommodate a different ratio. Furthermore, any size (order) DCT could be so modified, i.e. this invention is not limited to a particular ratio nor to a particular size (order) DCT. Accordingly, the numerical values and operands shown in equation (2) may be varied without deviating from the scope and contemplation of the present invention, i.e., the values and/or operands may be changed in an optimization process where the values are repeatedly varied until an optimized transformation is achieved.

One non-limiting aspect of the present invention is described in terms of the 8×8 DCT which is commonly used in MPEG-2, AVC|H.264, and HEVC|H.265. It is possible to improve coding of interlace signals in accordance with the present invention by using a different set of orthogonal basis functions for the vertical direction of a 2-dimensional DCT than those described below. Accordingly, the exemplary basis functions provided below is merely one means by which the coding may be improved. The present invention is also described for exemplary non-limiting purposes in terms of a signal that is decimated in one spatial direction (vertical) relative to the other direction (horizontal) resulting in a rectangular (vs. square) signal. The ratio between the horizontal and vertical directions as illustrated in this invention is 2:1, but is not limited to 2:1. That is, any ratio could be used for the modified DCT that is described in this invention.

The second transform basis functions, to accommodate the horizontal: vertical ratio of 2:1 for both the period and distance between adjacent samples and the length of the period for an interlaced video signal, may be as follows:

sf=0.353553
p=0,m=0,coeff=1.0000000000000000
p=0,m=1,coeff=1.0000000000000000
p=0,m=2,coeff=1.0000000000000000
p=0,m=3,coeff=1.0000000000000000
p=0,m=4,coeff=1.0000000000000000
p=0,m=5,coeff=1.0000000000000000
p=0,m=6,coeff=1.0000000000000000
p=0,m=7,coeff=1.0000000000000000
sf=0.500000
p=1,m=0,coeff=0.9807852804032304
p=1,m=1,coeff=0.5555702330196023
p=1,m=2,coeff=-0.1950903220161282
p=1,m=3,coeff=-0.8314696123025453
p=1,m=4,coeff=-0.9807852804032304
p=1,m=5,coeff=-0.5555702330196022
p=1,m=6,coeff=0.1950903220161283
p=1,m=7,coeff=0.8314696123025452
sf=0.500000
p=2,m=0,coeff=0.9238795325112867
p=2,m=1,coeff=-0.3826834323650897
p=2,m=2,coeff=-0.9238795325112867
p=2,m=3,coeff=0.3826834323650900
p=2,m=4,coeff=0.9238795325112867
p=2,m=5,coeff=-0.3826834323650898
p=2,m=6,coeff=-0.9238795325112867
p=2,m=7,coeff=0.3826834323650898
sf=0.500000
p=3,m=0,coeff=0.8314696123025452
p=3,m=1,coeff=-0.9807852804032304
p=3,m=2,coeff=0.5555702330196018
p=3,m=3,coeff=0.1950903220161288
p=3,m=4,coeff=-0.8314696123025456
p=3,m=5,coeff=0.9807852804032304 p=3,m=6,coeff=−0.5555702330196015
p=3,m=7,coeff=−0.1950903220161300
sf=0.500000
p=4,m=0,coeff=0.7071067811865476
p=4,m=1,coeff=−0.7071067811865477
p=4,m=2,coeff=0.7071067811865477
p=4,m=3,coeff=−0.7071067811865472
p=4,m=4,coeff=0.7071067811865472
p=4,m=5,coeff=−0.7071067811865475
p=4,m=6,coeff=0.7071067811865475
p=4,m=7,coeff=−0.7071067811865475
sf=0.500000
p=5,m=0,coeff=0.5555702330196023
p=5,m=1,coeff=0.1950903220161283
p=5, m=2,coeff=−0.8314696123025451
p=5,m=3,coeff=0.9807852804032307
p=5, m=4,coeff=−0.5555702330196026
p=5, m=5,coeff=−0.1950903220161286
p=5, m=6,coeff=0.8314696123025438
p=5,m=7,coeff=−0.9807852804032308
sf=0.500000
p=6,m=0,coeff=0.3826834323650898
p=6, m=1,coeff=0.9238795325112865
p=6,m=2,coeff=−0.3826834323650906
p=6, m=3,coeff=−0.9238795325112863
p=6,m=4,coeff=0.3826834323650909
p=6, m=5,coeff=0.9238795325112868
p=6, m=6,coeff=−0.3826834323650912
p=6, m=7,coeff=−0.9238795325112854
sf=0.500000
p=7,m=0,coeff=0.1950903220161283
p=7, m=1,coeff=0.8314696123025456
p=7,m=2,coeff=0.9807852804032304
p=7,m=3,coeff=0.5555702330196015
p=7, m=4,coeff=−0.1950903220161302
p=7, m=5,coeff=−0.8314696123025450
p=7,m=6,coeff=−0.9807852804032297
p=7, m=7,coeff=−0.5555702330196007

(sf is the scale factor used to scale the resulting coefficients.)

The corresponding identity matrix showing that the basis functions are orthonormal:

1.0000 0.0000 0.0000 −0.0000 0.0000 −0.0000 0.0000 0.0000
0.0000 1.0000 −0.0000 −0.0000 0.0000 −0.0000 −0.0000 0.0000
0.0000 −0.0000 1.0000 −0.0000 −0.0000 0.0000 0.0000 −0.0000
−0.0000 −0.0000 −0.0000 1.0000 0.0000 0.0000 0.0000 0.0000
0.0000 0.0000 −0.0000 0.0000 1.0000 −0.0000 −0.0000 −0.0000
−0.0000 −0.0000 0.0000 0.0000 −0.0000 1.0000 −0.0000 0.0000
0.0000 −0.0000 0.0000 0.0000 −0.0000 −0.0000 1.0000 −0.0000
0.0000 0.0000 −0.0000 0.0000 −0.0000 0.0000 −0.0000 1.0000

To compute a 2D DCT with the horizontal basis functions as the original functions (such as they are for interlace) and with new vertical basis functions, perform the original 1D DCT for the horizontal domain, and the new 1D DCT for the vertical domain. The resulting transform matrix is orthogonal because both the original and modified sets of basis functions are orthonormal.

The C program used to generate these basis functions may be demonstrated as shown below:

```
#include <stdio.h>
#include <math.h>
int main ( int argc, char * argv ) {
    int m, p ;
    int i, j, k ;
    /*********************************************************************
    **********
    * Size of period used to describe basis functions. For interlace this
    is M=16 because each of the samples is really two samples apart in the vertical dimension
    (relative to the horizontal dimension)
    *********************************************************************/
    #if defined NEW
        int M = 16;
    #else
        int M = 8;
    #endif
    double coeff = 0.0 ;
    double sf = 0.0 ;
    double fdct_coeffs[8][8] ;
    double idct_coeffs[8][8] ;
    double norm[8][8] ;
    /* have only 8 samples even though they are each taken two samples
apart from each other. */
    #if defined NEW
        for ( p = 0; p<(M/2); p++ ) {
    #else
        for ( p = 0; p<M; p++ ) {
    #endif
        if (!p )
            sf = (1/sqrt((double) M)) ;
        else
            sf = sqrt((double) (2.0/M)) ;
    #if defined NEW
        sf*=sqrt(2.0);
    #else
        sf*=1.0;
    #endif
        printf("==========================\n");
```

-continued

```
        printf("sf=%lf\n",sf) ;
        /* have only 8 samples even though they are each taken two samples
apart from each other. */
        #if defined NEW
                for ( m = 0; m<(M/2); m++ ) {
        #else
                for ( m = 0; m<M; m++ ) {
        #endif
        /*******************************************************************
         * Modify the basis functions that we compute for interlace vs.
progressive
         * NEW modifies which functions we compute. The original
TYPE 2 DCT is in the
         * conditional else compilation.
        *******************************************************************/
        #if defined NEW
                coeff=cos(( (2.0*4.0*(double)m + 2.0)*(double)p*M_PI)
/ (2.0*(double)M) ) ;
        #else
                coeff=cos(( (2.0*(double)m + 1.0)*(double)p*M_PI) /
(2.0*(double)M) ) ;
        #endif
        /*******************************************************************
         * scale the coefficients based on the original formula for a
Type 2 DCT
        *******************************************************************/
                fdct_coeffs[p][m] = coeff*sf ;
        /*******************************************************************
         * For a unitary transform, the inverse is simply the transpose
of the forward transform
         * The DCT is a unitary transform, that means that the inverse
is simply the transpose.
        *******************************************************************/
                idct_coeffs[m][p] = coeff*sf ;
                printf("p=%d,m=%d,coeff=%1.16lf\n",p,m,coeff);
                norm[p][m] = 0.0 ;
            }
        }
        for ( i = 0 ; i<8; i++ ) {
            for ( j = 0; j<8; j++ ) {
                for ( k=0; k<8; k++ ) {
                    norm[i][j]+= fdct_coeffs[i][k] * idct_coeffs[k][j];
                }
            }
        }
        printf("\n\n");
        for ( i=0; i<8; i++ ) {
            for ( j=0; j<8; j++ ) {
                printf("%1.4lf ",norm[i][j] ) ;
            }
            printf("\n");
        }
        return ( 0 ) ;
    }
```

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A non-transitory computer-readable medium having a plurality of non-transitory instructions operable with a processor to facilitate transforming data from a spatial domain to a frequency domain, the non-transitory instructions being sufficient for: determining a first two-dimensional input matrix of first sample values representing first data in a spatial domain; transforming the first two-dimensional input matrix into a first two-dimensional coefficient matrix using a first transform function, the first two-dimensional coefficient matrix being sufficient for representing the first data in a frequency domain, the first transform function transforming the first two-dimensional input matrix in a vertical direction differently than in a horizontal direction such that the first transfer function is characterized as being non-square; generating the first two-dimensional coefficient matrix according to the first transform function defined as:

$$F(u,v) = c(u)c(v) \sum_{x=0}^{M-1} \sum_{y=0}^{N-1} f(x,y) \cos\frac{(2x+1)u\pi}{2M} \cos\frac{(8y+2)v\pi}{2*2N},$$

$$0 \le x \le M-1, 0 \le y \le N-1$$

wherein:

$$c(v) \begin{cases} \frac{\sqrt{2}}{\sqrt{N}}, & v = 1 \\ \frac{2\sqrt{2}}{\frac{\sqrt{2}}{N}}, & 1 \leq v \leq N-1 \end{cases};$$

$$c(u) \begin{cases} \frac{1}{\sqrt{M}}, & u = 1 \\ \frac{2}{\sqrt{2}/M}, & 1 \leq u \leq M-1 \end{cases};$$

and
f(x,y).

2. The non-transitory computer-readable of claim 1 further comprising non-transitory instructions sufficient for: determining a second two-dimensional input matrix of second sample values representing second data in the spatial domain; and transforming the second two-dimensional input matrix into a second two-dimensional coefficient matrix using a second transform function, the second two-dimensional coefficient matrix being sufficient for representing the second data in the frequency domain, the second transform function transforming the second sample values in the vertical direction the same as the second sample values in the horizontal direction such that the second transfer function is characterized as being square.

3. The non-transitory computer-readable medium of claim 2 further comprising non-transitory instructions sufficient for determining the first and second two-dimensional input matrixes from a plurality of matrixes, the first two-dimensional input matrix being determined from one of the plurality of matrixes associated with interlaced video and the second two-dimensional input matrix being determined from one of the plurality of matrixes associated with progressive video.

4. The non-transitory computer-readable medium of claim 2 further comprising non-transitory instructions sufficient for determining the first and second two-dimensional input matrixes from a plurality of matrixes, the first two-dimensional input matrix being determined from one of the plurality of matrixes associated with a 2:1 ratio of horizontal to vertical samples and the second two-dimensional input matrix being determined from one of the plurality of matrixes associated with a 1:1 ratio of horizontal to vertical samples.

5. The non-transitory computer-readable medium of claim 2 further comprising non-transitory instructions sufficient for determining the first and second two-dimensional input matrixes from a plurality of matrixes, the first two-dimensional input matrix being determined from one of the plurality of matrixes associated with a rectangular signal and the second two-dimensional input matrix being determined from one of the plurality of matrixes associated with a square signal.

6. A non-transitory computer-readable medium having a plurality of non-transitory instructions operable with a processor to facilitate transforming data from a spatial domain to a frequency domain, the non-transitory instructions being sufficient for: determining a first two-dimensional input matrix of first sample values representing first data in a spatial domain; transforming the first two-dimensional input matrix into a first two-dimensional coefficient matrix using a first transform function, the first two-dimensional coefficient matrix being sufficient for representing the first data in a frequency domain, the first transform function transforming the first two-dimensional input matrix in a vertical direction differently than in a horizontal direction such that the first transfer function is characterized as being non-square; determining a second two-dimensional input matrix of second sample values representing second data in the spatial domain; and transforming the second two-dimensional input matrix into a second two-dimensional coefficient matrix using a second transform function, the second two-dimensional coefficient matrix being sufficient for representing the second data in the frequency domain, the second transform function transforming the second sample values in the vertical direction the same as the second sample values in the horizontal direction such that the second transfer function is characterized as being square; generating the second two-dimensional coefficient matrix according to the second transform function defined as:

$$F(u, v) = c(u)c(v) \sum_{x=0}^{M-1} \sum_{y=0}^{N-1} f(x, y) \cos\frac{(2x+1)u\pi}{2M} \cos\frac{(8y+2)v\pi}{2*2N},$$

$$0 \leq x \leq M-1, 0 \leq y \leq N-1$$

wherein:

$$c(v) \begin{cases} \frac{\sqrt{2}}{\sqrt{N}}, & v = 1 \\ \frac{2\sqrt{2}}{\frac{\sqrt{2}}{N}}, & 1 \leq v \leq N-1 \end{cases};$$

$$c(u) \begin{cases} \frac{1}{\sqrt{M}}, & u = 1 \\ \frac{2}{\sqrt{2}/M}, & 1 \leq u \leq M-1 \end{cases};$$

and
f(x,y) represents the second two-dimensional input matrix of the second sample values and F(u, v) represents the second two-dimensional coefficient matrix as an M-by-N matrix of transform coefficients.

7. The non-transitory computer-readable medium of claim 1 further comprising non-transitory instructions sufficient for generating the first two-dimensional input matrix of first sample values such that the first data represents colors values for a macroblock selected from a video frame.

8. The non-transitory computer-readable medium of claim 7 further comprising non-transitory instructions sufficient for generating the color values according to a YCbCr color space.

9. The non-transitory computer-readable medium of claim 7 further comprising non-transitory instructions sufficient for selecting the macroblock to correspond with first plurality of pixels included in the video frame, the first plurality of pixels being included within a second plurality of pixels forming the video frame, the second plurality of pixels being arranged in rows along the vertical direction and in columns along the horizontal direction.

10. The non-transitory computer-readable medium of claim 9 further comprising non-transitory instructions sufficient for generating the first two-dimensional input matrix to include 64 color values arranged in an 8×8 configuration, each the color value representing color for one pixel in the macroblock.

11. The non-transitory computer-readable medium of claim 10 further comprising non-transitory instructions sufficient for selecting the first plurality of pixels to correspond with pixels in every other row of the video frame in the vertical direction and with pixels in adjoining columns of the video frame in the horizontal direction.

12. A non-transitory computer-readable medium having a plurality of non-transitory instructions operable with a processor to facilitate transforming pixels of a video frame from a spatial domain to a frequency domain, the non-transitory instructions being sufficient for: determining a first two-dimensional input matrix of first sample values representing color values for a first plurality of the pixels in a spatial domain; transforming the first two-dimensional input matrix into a first two-dimensional coefficient matrix using a first transform function, the first two-dimensional coefficient matrix being sufficient for representing the color values in a frequency domain, the first transform function transforming the first two-dimensional input matrix in a vertical direction differently than in a horizontal direction such that the first transfer function is characterized as being non-square; generating the first two-dimensional coefficient matrix according to the first transform function defined as:

$$F(u, v) = c(u)c(v) \sum_{x=0}^{M-1} \sum_{y=0}^{N-1} f(x, y) \cos \frac{(2x+1)u\pi}{2M} \cos \frac{(8y+2)v\pi}{2*2N},$$

$$0 \leq x \leq M-1, 0 \leq y \leq N-1$$

wherein:

$$c(v) \begin{cases} \frac{\sqrt{2}}{\sqrt{N}}, & v = 1 \\ \frac{2\sqrt{2}}{\frac{\sqrt{2}}{N}}, & 1 \leq v \leq N-1 \end{cases};$$

and $$c(u) \begin{cases} \frac{1}{\sqrt{M}}, & u = 1 \\ \frac{2}{\sqrt{2}/M}, & 1 \leq u \leq M-1 \end{cases};$$

and f(x,y) represents the first two-dimensional input matrix of color values and F(u, v) represents the first two-dimensional coefficient matrix as an M-by-N matrix of transform coefficients.

13. The non-transitory computer-readable medium of claim 12 further comprising non-transitory instructions sufficient for generating the first two-dimensional input matrix to be one of an 4×4, 8×8, 16×16 and 32×32 configuration, each color value representing color for one pixel of the first plurality of pixels.

14. The non-transitory computer-readable medium of claim 13 further comprising non-transitory instructions sufficient for selecting the first plurality of pixels to correspond with pixels in every other row of the video frame in the vertical direction and with pixels in adjoining columns of the video frame in the horizontal direction.

15. The non-transitory computer-readable medium of claim 12 further comprising non-transitory instructions sufficient for generating the color values according to a YCbCr color space.

16. The non-transitory computer-readable medium of claim 12 further comprising non-transitory instruction sufficient for selecting the first plurality of pixels to correspond with colored pixels included in every other row of the video frame, the video frame being an interlaced video frame having the pixels in every other row of the vertical direction and blanks or no pixels in the rows there between.

\* \* \* \* \*